United States Patent
de Jong et al.

(10) Patent No.: US 7,814,124 B1
(45) Date of Patent: *Oct. 12, 2010

(54) ARCHITECTURE AND METHOD FOR SERIALIZATION AND DESERIALIZATION OF OBJECTS

(75) Inventors: Stephen Peter de Jong, Bellevue, WA (US); Gopala Krishna R. Kakivaya, Sammamish, WA (US); Joseph L. Roxe, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 665 days.

This patent is subject to a terminal disclaimer.

(21) Appl. No.: 11/178,847

(22) Filed: Jul. 11, 2005

Related U.S. Application Data

(63) Continuation of application No. 09/893,031, filed on Jun. 27, 2001, now Pat. No. 6,928,488.

(51) Int. Cl.
*G06F 7/00* (2006.01)
(52) U.S. Cl. .................. 707/798; 707/811; 709/231
(58) Field of Classification Search .............. 707/100, 707/103 R; 709/246
See application file for complete search history.

(56) References Cited

U.S. PATENT DOCUMENTS

| | | | |
|---|---|---|---|
| 5,895,492 | A | 4/1999 | Greenspan et al. |
| 5,944,781 | A | 8/1999 | Murray |
| 5,960,436 | A | 9/1999 | Chang et al. |
| 6,032,152 | A | 2/2000 | Pearson |
| 6,119,219 | A | 9/2000 | Webb et al. |
| 6,125,400 | A | 9/2000 | Cohen et al. |
| 6,140,946 | A | 10/2000 | Desrosiers et al. |
| 6,253,253 | B1 | 6/2001 | Mason et al. |
| 6,282,581 | B1 * | 8/2001 | Moore et al. ............... 719/316 |
| 6,292,933 | B1 | 9/2001 | Bahrs et al. |
| 6,385,724 | B1 * | 5/2002 | Beckman et al. ............ 713/167 |
| 6,459,393 | B1 | 10/2002 | Nordman |
| 6,501,852 | B1 | 12/2002 | Clark et al. |
| 6,571,252 | B1 * | 5/2003 | Mukherjee ............... 707/103 R |

(Continued)

OTHER PUBLICATIONS

Roussev et al., "Integrating XML and Object-based Programming for Distributed Collaboration", IEEE 9th International workshops on Enabling Technologies for Collaborative Enterprises, Jun. 14-16, 2000, p. 254-259.*

(Continued)

*Primary Examiner*—Neveen Abel Jalil
*Assistant Examiner*—Vei-Chung Liang
(74) *Attorney, Agent, or Firm*—Workman Nydegger

(57) ABSTRACT

An architecture and method is provided that facilitates serialization of a graph of objects into streams of data in an arbitrary format, and deserialization of the streams of data back into the graph of objects. The architecture provides a number of services associated with the basic functionality of serialization and deserialization. The services can be employed to implement transparent remoting, copy items to a clipboard and save data to a file. The present invention provides facilities which support the plugging in of a new serialization encoding by separating the encoding from the reading and reinstantiation of the graph of objects which the encoding describes. Objects in a graph of objects are serialized and deserialized based on a selected rule set for that object. A rule set can be provided by a class author within a class or within a third party file referred to as a surrogate.

13 Claims, 11 Drawing Sheets

U.S. PATENT DOCUMENTS 6,898,618 B1 * 5/2005 Slaughter et al. ............ 709/203
7,016,966 B1 * 3/2006 Saulpaugh et al. .......... 709/230

OTHER PUBLICATIONS

David Flanagan, Java in a Nutshell, Second edition, May 1997, O'Reilly and Associates Inc.*

Gerard Parr, et al.; "A Paradigm Shift in the Distribution of Multimedia", Communications of the ACM, Jun. 2000, p. 103-109, vol. 43, No. 6.

Marc-Olivier Killijian, et al.; "Portable Serialization of CORBA objects: A Reflective Approach", Proceedings of the 17th Annual ACM Conference on Object-Oriented Programming, Systems, Languages, and Applications, 2002, pp. 68-82.

Fabian Breg, et al.; "Java Virtual Machine Support for Object Serialization", Proceedings of the 2001 Joint ACM-ISCOPE conference on Java Grande, 2001, pp. 173-180.

Christian Nester, et al; "A More Efficient RMI for Java", Proceedings of the ACM 1999 Conference on Java Grande, 1999, pp. 152-159.

* cited by examiner

ARCHITECTURE AND METHOD FOR SERIALIZATION AND DESERIALIZATION OF OBJECTS

CROSS REFERENCE TO RELATED APPLICATIONS

This application is a continuation of U.S. patent application Ser. No. 09/893,031, filed Jun. 27, 2001 now U.S. Pat. No. 6,928,488 and entitled, "ARCHITECTURE AND METHOD FOR SERIALIZATION AND DESERIALIZATION OF OBJECTS." The entirety of the aforementioned application is incorporated herein by reference.

TECHNICAL FIELD

The present invention relates generally to serialization and deserialization of objects and more particularly, to a serialization architecture and method that provides developers or users with control over the serialization and deserialization process.

BACKGROUND OF THE INVENTION

Serialization is a mechanism for taking a data structure (e.g., a graph of objects, a call stack) and converting it to a stream of data in a particular external format. At deserialization, the stream of data is converted back into the data structure with the same topology of the original data structure. Serialization facilitates inter-process communication such as transmissions between address spaces, or persistence such as storage on a non-volatile media. For example, an executable program can be serialized at a server end and transferred over to an application running on a client end for executing the executable program at the client. Additionally, an object can be serialized and stored in contiguous memory to save space. Inter-process communications and object persistence are fundamental techniques used in many software applications. The main use of a serialization stream is for saving a graph of objects externally in a file or transferring the serialization data by remoting between computer process or processors.

A serialization stream externalizes the internal description of a graph of objects. The external description will vary depending on its uses. HTML and XML formats provide easy to read formats, which are widely used in interoperation between different systems. Binary formats are used for the efficient transfer of data. Typically, the formats that are used are selected for standards or computation reasons. Conventional distributed object systems may have built-in support for the operations involved in serialization and deserialization of data structures. Serialization is a standard part of many object frameworks. However, the format in which the serialization stream has been externalized is fixed according to the framework being utilized. Furthermore, conventional formats are not selectable, customizable or pluggable.

Serialization is typically performed by a formatter. Serialization involves writing the state information of parameters and/or objects to a stream that may be read by a formatter on a server, so that the parameters and/or objects can be recreated on the server side. Similarly, serialization involves writing the state information of return parameters and/or objects to a stream that may be read by a formatter on the client, so that the return parameters and/or objects can be recreated back on the client side. Formatters also typically perform the inverse operation of deserialization. The formatters dictate the format in which the parameters and/or objects and their associated state are written to the stream. For example, a first formatter may employ a binary format while a second formatter may employ an XML format to represent the types of the parameters and/or objects and their associated state. Conventionally, formatters are not selectable, pluggable or customizable and thus conventional systems suffer from problems associated with inflexibility (e.g., inability to interact with new externalized formats).

Conventional distributed object systems may have built-in support for the operations involved in parameter marshalling, which is the packaging of the parameters (call and return) of method calls made on remote objects. Typically, such built-in parameter marshalling is not customizable. In distributed object systems, a user application typically has a local representative or proxy to a remote object, where the remote object is often referred to as the server and/or server object. The distributed object system infrastructure typically intercepts method calls made on the proxy, and, in collaboration with infrastructure code delivers the call and parameters associated with the call from the proxy to the server. Similarly, results of the invocation of the call on the server are propagated by the infrastructure from the server back to the proxy, so that to the user it appears that the call executed locally. Thus, processing involved in remoting a call made on a proxy includes serializing parameters (which may reference objects holding state on the client) associated with the method call.

Conventional serialization and deserialization architectures do not provide for remoting that is pluggable, customizable or selectable. Custom routines are employed to provide remoting between a server and a client. A developer or user must conform to these customized routines to allow for remoting of their respective applications. Additionally, conventional serialization and deserialization architectures do not provide mechanisms for dealing with special circumstances, such as a one instance per process situation. Again, custom routines must be adhered to serialize and deserialize graphs of object containing such object types.

Thus, there remains an unmet need for a system and method that mitigates inflexibility problems associated with conventional serialization and deserialization architectures.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to an architecture that facilitates serialization of a graph of objects into streams of data in an arbitrary format, and deserialization of the streams of data back into the graph of objects. The architecture provides a number of services associated with the basic functionality of serialization and deserialization. The services can be employed to implement transparent remoting, copy items to a clipboard and save data to a file. The present invention provides facilities which support the plugging in of a new serialization encoding by separating the encoding from the reading and reinstantiation of the graph of objects which the encoding describes. Objects in a graph of objects are serialized and deserialized based on a selected rule set for that object type. A rule set can be user definable and can be provided by a class author within a class or within a third party file referred to as a surrogate.

A surrogate is an object that specifies what information is serialized for an object of a particular type. A surrogate can be assigned to one or more objects in a graph and different surrogates can be assigned to different objects within a graph. The formatter determines if objects support a user-defined rule set and employs that user-defined rule set during serialization and deserialization of the object. The user-defined rule set can be defined in the object or in a third party object. If the object does not employ a user-defined rule set, the formatter provides a default rule set for serialization as long as serialization markings are provided within the object. The present invention provides facilities which support the plugging in or functionality of formatters in any given wire format (e.g., binary, XML, HTML) for transferring across a connection or between processes.

An object manager is used during deserialization of the graph of objects. The object manager stores information regarding objects within the stream during receipt of a stream. The serialization architecture then provides an uninstantiated instance of a given object type that can be populated with object data by the formatter and the object manager. Working together, the formatter and object manager maintain the invariants dictated by each object's rule set. Once the object is deserialized, the object can be populated with data from forward referenced objects, which is referred to as fixups.

A surrogate can employ a remote interface component (e.g., marshalbyref, objectref), so that an object reference can be provided instead of the actual object for serialization. The object reference contains information about the actual object. The object reference can then be serialized. A class author can also define a type as being an object reference within the class and provide an object reference class for serializing instead of the actual object. The object reference can be employed in the case of remoting and the special circumstance where only one class per instance is allowed. During deserialization, an object manager will store a proxy reference to the actual object until the object manager is ready for the actual object. Once the invariants required by that proxy's rule set have been fulfilled, the object manager will request the actual object. The proxy is responsible for populating the actual object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
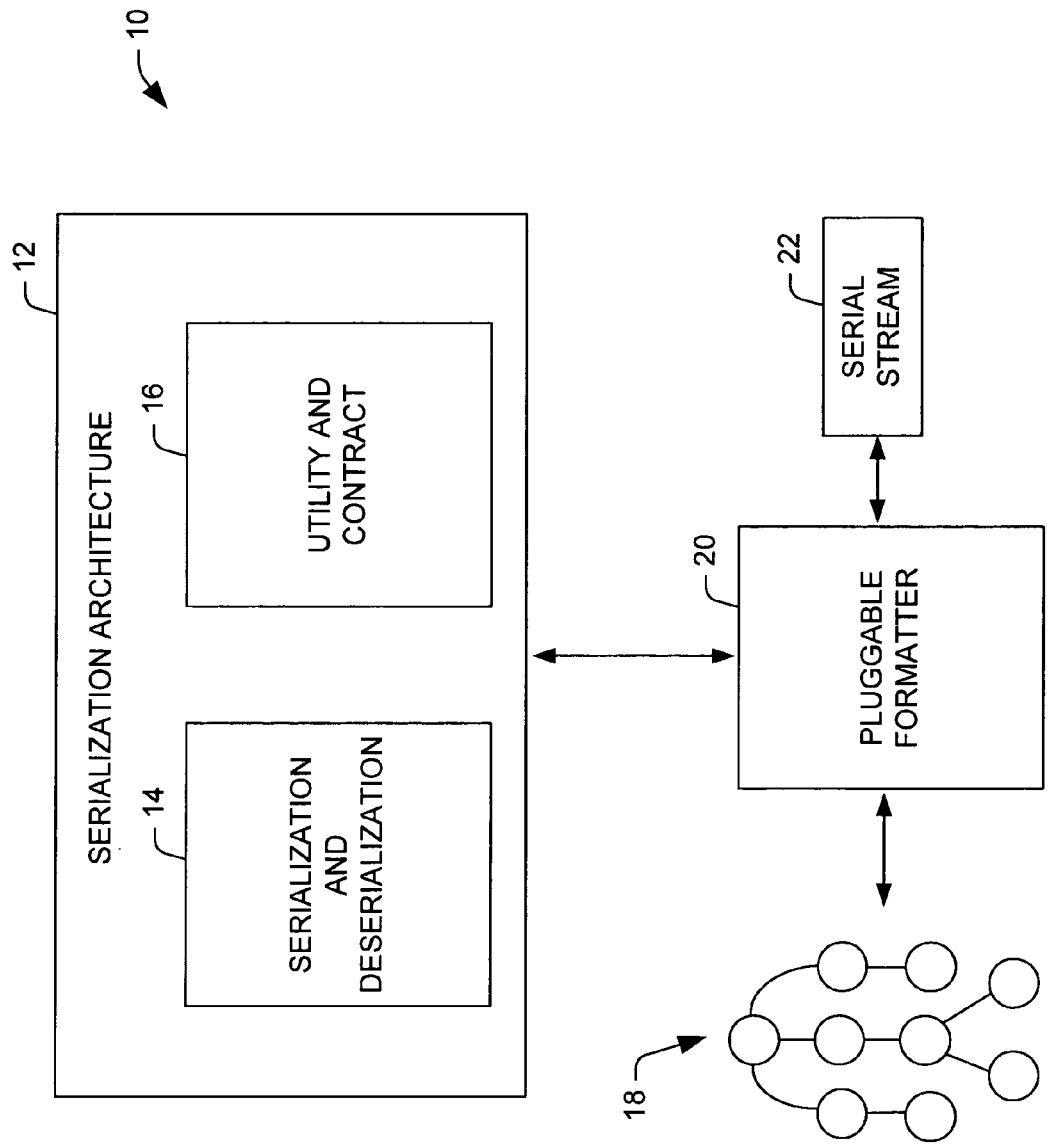
FIG. 1 is a schematic block diagram illustrating a system that facilitates serialization of a graph of objects into a serialization stream employing a serialization architecture in accordance with one aspect of the present invention.

The present invention is now described with reference to the drawings. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component.

In conventional systems for serializing and deserializing a graph of objects, the type of object, assignment of object IDs, the way a serialization stream is populated and the externalized format of the serialization stream is dictated by the formatter during the serialization process. Additionally, remoting and other special circumstances are customized services provided by a distributed object system and developers have minimal control over the remoting process, the serialization process (e.g., what gets serialized) or the encoding of the serialized stream. Additionally, conventional formatters handle the tracking of objects within the serialization stream, registering objects, handling forward and backward references and the reinstantiation of objects during the deserialization process. The present invention provides a system and method for facilitating employment of pluggable formatters (i.e., formatters with different externalized formats) by providing a variety of functions or services outside the formatter for handling various serialization and deserialization functions associated with conventional formatters. The system and method also provides a plurality of services for maintaining invariants associated with forward references, remoting and one instance per process requirements.

A plurality of services are provided that separate serialization/deserialization of a graph of objects from the encoding/decoding of the externalized format of the serialization stream. The serialization/deserialization information is the information about the object provided in the serialization stream or population information and the externalized format refers to the encoding and decoding of the serialization stream in a particular format. Although the present examples will be illustrated with respect to the serialization and deserialization of a graph of objects, it is to be appreciated that the present invention is applicable to serialization and deserialization of a number of different data structures (e.g., a call stack).

FIG. 1 illustrates a system 10 for serialization and deserialization of a graph of objects. The system 10 includes a serialization architecture 12 having a serialization and deserialization portion 14 and a utility and contract portion 16. The serialization portion and deserialization portion 14 provides the functionality associated with providing a pluggable formatter 20 with serialization and deserialization information for a given object type. A class author can define what data is serialized for the class by implementing a particular rule set associated with the serialization and deserialization portion 14. For example, a class author can place markings and/or employ methods in the class to allow the serialization and deserialization portion 14 to provide the pluggable formatter with certain serialization information from the object or restrict certain serialization information based on a given object type.

Alternatively, a third party object or file (e.g., a surrogate) will determine what serialization information that will be provided for a given object type to the pluggable formatter 20. The third party object or file can provide the pluggable formatter 20 with serialization information about an object type. A surrogate is an object that specifies what information is serialized for an object of a particular type. An object or third party object can also provide serialization information about an object reference to be serialized containing information about the object type, as opposed to serializing an instance of the object itself. The object reference can be employed in remoting situations when a proxy is to be provided to a client or when an object type is restricted to one instance per process, such that only one copy of the object type can be at any one location at a time.

The utility and contract portion 16 can provide the service of assigning unique IDs to each object in the graph of objects 18 prior to being serialized. After the serialization architecture 12 determines how the serial stream 22 is going to be populated with a given object's information, the object information is then pushed to a data structure. This is then repeated for each object in the graph 18, until object information for all of the objects have been written to the data structure. The data structure is then transmitted to the pluggable formatter 20. Alternatively, the objects can be serialized as they are retrieved (e.g., on the fly), such that the objects can be pushed to the pluggable formatter 20 and serialized one at a time. This is then repeated for each object until the entire graph 18 has been serialized.

The serialization and deserialization portion 14 then provides the pluggable formatter 20 with the serialization information. The pluggable formatter 20 converts the serialization information into a serial stream 22 in a particular externalized format defined by the pluggable formatter 20. For example, the pluggable formatter can write the serial stream 22 in XML, HTML, binary or a variety of other externalized formats. A variety of different formatters can be employed on the system 10, so that a developer can select between different externalized formats in which to serialize the object graph 18 into the serialized stream 22.

During deserialization, the pluggable formatter 20 decodes the serial stream 22 and the serialization and deserialization portion 14 works in conjunction with the utility and contract portion 16 to deserialize the serialized stream into a graph of objects. The main function of the utility and contract portion 16 is to maintain the invariants during the deserialization process. The pluggable formatter 20 receives the serial stream 22 in an encoded/serialized format in which the pluggable formatter 20 is designed to convert into object form (e.g., decode). The utility and contract portion 16 works in conjunction with the pluggable formatter 20 to repopulate the object graph 18. The pluggable formatter 20 is responsible for enforcing some of the type safety provisions and requesting an object of a particular type from the utility and contract portion 16. The utility and contract portion 16 instantiates an unitialized instance of a given object type for populating with object data for each object being deserialized. The utility and contract portion 16 determines the type to be instantiated. The utility and contract portion 16 then tracks objects and provided fixups due to forward object references. In the case of remoting, the utility and contract portion is responsible for swapping objects (e.g., marshal/proxy) and getting the real object (e.g., objectreference/realobject).

In some circumstances, serialization is employed in remoting of objects and transmission of an object containing information about that object (e.g., restrictions of one instance per class) instead of the object itself. The present invention addresses these situations by providing functionality that provides serialization information about a remote or reference object to the pluggable formatter, so that the pluggable formatter serializes this information instead of the serialization information about the object itself without needing the additional functionality required to address these special circumstances. Conventional formatters require this functionality to be embedded in the formatter itself, and thus do not allow for formatters that are selectable, pluggable or customizable.

Figure 2:
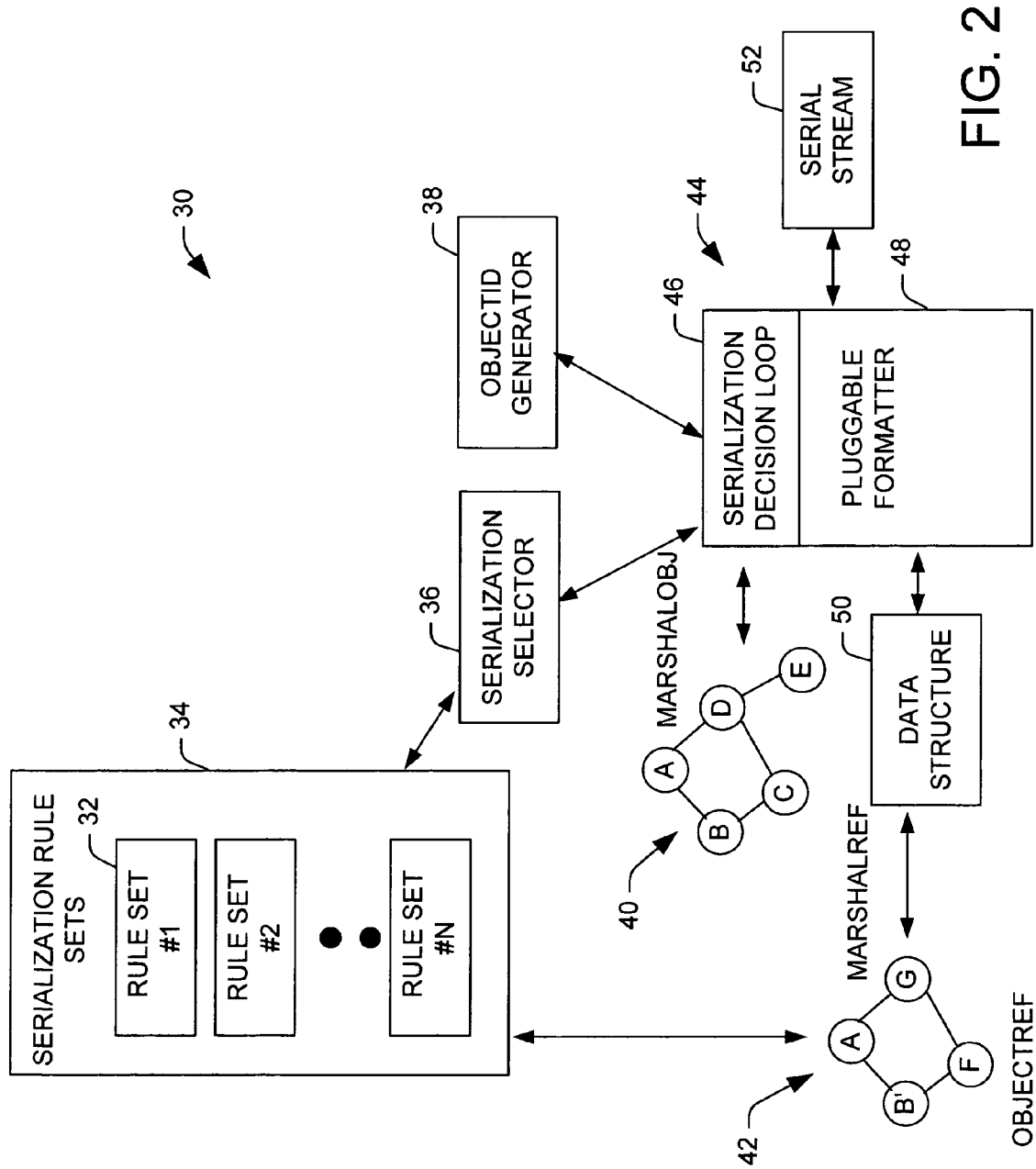
FIG. 2 is a schematic block diagram illustrating a system that facilitates serialization of a graph of objects into a serialization stream employing a plurality of services in accordance with one aspect of the present invention.

FIG. 2 illustrates components of a system 30 for serialization of a graph of objects into a serial stream in accordance with certain aspects of the present invention. The system 30 includes a formatter 44 having a serialization decision loop 46 and a pluggable formatter portion 48. The serialization decision loop 46 is responsible for retrieving objects within an object graph 40. The serialization decision loop 46 determines if an object referenced within the object graph has been previously retrieved, and assigns objects an object ID via an object ID generator 38 if that object has not been previously retrieved. The serialization decision loop 46 or the object ID generator 38 maintains an object list for tracking previously retrieved objects or object instances. Once it is determined if the object was or was not previously retrieved and the object ID is assigned to that object, the serialization decision loop 46 invokes a serialization selector 36.

The serialization selector 36 can be part of the formatter 44 or part of the serialization architecture. The serialization selector 36 matches a rule set 32 out of a plurality of rule sets 34 to a particular object type or informs the formatter 44 where to find a rule set for the particular object type. The object can contain information that associates that object with a rule set and invokes methods of the rule set, for example, by implementing an interface or through inheritance using a base class. In this way, the object can employ methods associated with a rule set and define a customized rule set within the object for determining the serialization information that will be provided to the formatter 44 for a given object type. Alternatively, the serialization selector 36 can identify customized rule sets in other objects for a given object type, so that a user can define serialization information for a given type within a third party object. For example, the customized rule set can reside in a third party object defining the serialization information that will be provided for a given object type and this rule set is used to determine that serialization information that will be provided from an object of that type. Alternatively, a customized rule set can be provided to define serialization information about a reference object type for a given object type which contain information about the serialized object but not the object data itself. This can apply to value types that are stack allocated as well. The customized rule set for implementing an object type reference can be defined in the object or in a third party object.

Some objects have information that needs to be secured or cannot be serialized in a standard fashion. Therefore, one of the rule sets 32 can be provided to define how the object would be serialized or define how the object serialization information within the portion of the serialized stream containing the object information would get populated with object data and what object data would the serialization stream receive. The rule set can reside within the object or within another object based on a given object type. Serialization information is essentially a series of name value pairs representing fields of the objects with additional information contained in metadata such as object type and data type. One of the rule sets 32 can dictate if serialization information is to be provided about another object type in place of that object for a given object type or restrict the information that will be provided for that object for a given object type.

The rule set 32 can be contained in one or more other objects developed by a user or developer so that the user can define how they want objects of a particular class type to be populated to a data structure 50 outside the actual object. Additionally, the rule set 32 can provide serialization information about a replacement object containing information about the object type to be serialized, such as a remote or proxy object or a reference object containing information about the real object. The serialization information about the replacement object can be contained within the object or within a third party object. Alternatively, the rule set can be defined in the object that is being serialized (e.g., by employing methods of an implemented interface or an inherited serializable class), so that developers can define how they want the stream populated with data defined in the object itself. A default serialization can be provided if an object is serializable (e.g., marked with serializable attributes or marked with non-serializable attributes), but no particular rule set is provided in another object or the object itself. The default serialization can be defined in a rule set 32 or embedded into the formatter 44.

For example, the graph of objects 40 contains five objects. Object A includes general markings within the objects that indicate that the object is serializable. The object A is assigned an ID and the serialization selector 36 selects a default rule set that determines that the object A will be retrieved and serialized in a standard format as seen in modified graph 42. The data of object A will then be pushed to the data structure 50. Object B implements methods from a rule set that allows a user to restrict serialization of B such that portions of object B will not be serialized. The object B is assigned an ID and the serialization selector 36 employs the methods of a serialization rule set. Object B will be retrieved and serialized in a modified format B' as seen in modified graph 42.

Object C and object D are special cases where the rule set determines that serialization information from another object will be serialized in place of object C and object D. Object C is an object that is restricted to one instance per process. In this circumstance, a user can define a rule set that provides an object or object reference type F that contains information about object C, that is needed for deserialization of F an ultimately retrieval of object C. Object D is a marshall object for providing a remoting interface to a client. In this circumstance, a rule set can be defined that provides a marshal reference G that contains information about object D and E, that is needed for creating a proxy reference at a client end.

After it is determined how the serialization information of the modified graph 42 is going to be populated with object information, the object information is then pushed to the data structure 50. This is repeated for each object in the modified graph 42, until object information for all of the objects have been written to the data structure 50. The data structure 50 is then transmitted to the pluggable formatter portion 48 of the formatter 44. The pluggable formatter portion 48 serializes the graph of objects in a preselected externalized format. Alternatively, the objects can be serialized as they are retrieved (e.g., on the fly), such that serialization information for each object is pushed to the data structure 50 one at a time and then serialized by the pluggable formatter 44 in a preselected externalized format. This is then repeated for each object until the entire graph 42 has been serialized.

Figure 3:
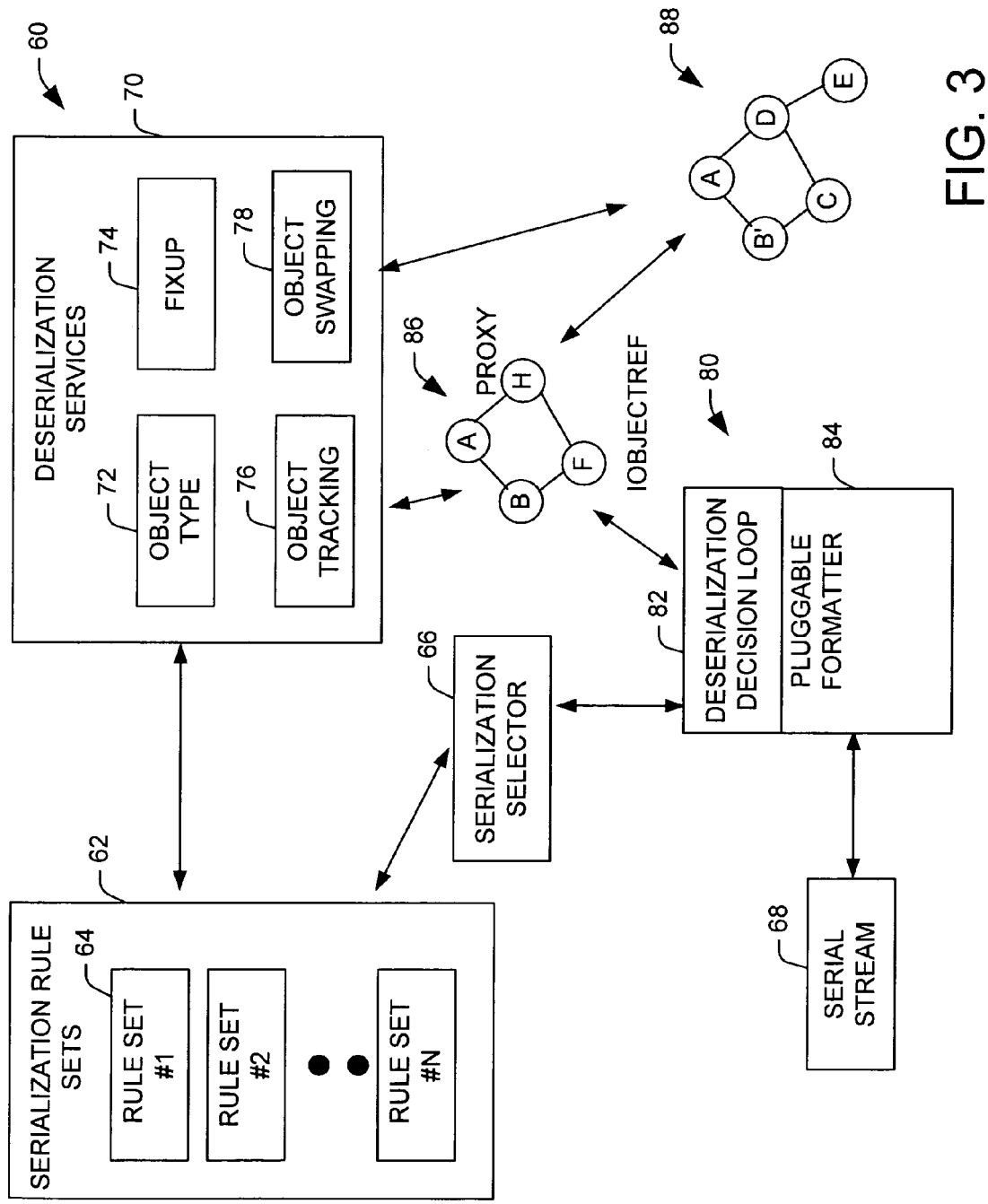
FIG. 3 is a schematic block diagram illustrating a system that facilitates deserialization of a serialization stream into a graph of objects employing a plurality of services in accordance with one aspect of the present invention.

FIG. 3 illustrates a system 60 for deserialization of a serial stream into a graph of objects in accordance with certain aspects of the present invention. The system 60 includes a formatter 80 having a deserialization decision loop 82 and a pluggable formatter portion 84. The deserialization decision loop 82 is responsible for retrieving objects within a serial stream 68. The deserialization decision loop 82 invokes a serialization selector 66. The serialization selector 66 can be part of the formatter 80 or part of a serialization architecture. The serialization selector 66 matches a rule set 64 out of a plurality of rule sets 62 to a particular object type or informs the formatter 80 where to find a rule set for the particular object type. The rule set 64 provides information on how an object was serialized so that the object can be deserialized by the formatter 80.

The object can contain information that associates that object with a rule set and invokes methods of the rule set, for example, by implementation of an interface. In this way, the object can employ methods associated with a rule set and define a customized rule set within the object for determining the deserialization information that will be provided to the formatter 80. Alternatively, the object can identify a customized rule set for obtaining serialization information from another object, so that the user can define deserialization information that informs a set of deserialization services 70 that the object being received is a reference object which contain information about the object but not the object data itself. The serialization selector can also determine that a third party object defines the serialization information that is provided for an object of a given type.

The set of deserialization services 70 contain an object type service 72 which determines what object type to be provided for deserialization of the object read off the serial stream. The object type service 72 then creates an uninitialized instance or object shell of that type, a similar type or another type of which no constructor has been called for deserialization of the object. The constructor itself can reside in the object or serialized data and can be invoked once the object is deserialized in certain circumstances. An object tracking service 76 is provided for tracking objects during the deserialization process. Each object registers with the object tracking service 76 as it is deserialized. The object tracking service 76 looks at the object and determines references to other objects within the object (e.g., forward references, backward references). If the referenced object is not available (e.g., down the serialization stream), the formatter 80 commands the object tracking service 76 to record a fixup for that object. The object tracking service 76 then records a fixup for that object. The object tracking service 76 also guarantees that the deserialization information is complete before an object can be called. Once the deserialization of one or all objects is complete, a fixup service 74 is performed to fill in objects with data associated with the forward references to complete reinstantiation of the object or the graph 86.

The deserialization services 70 also include an object swapping service 78 responsible for remoting and the special circumstance of one instance per process. For remoting, the object swapping service 78 provides a proxy to a marshal reference when an object reference to the marshal references is received. For the one instance per process situation, the object swapping service 78 stores the object reference, until the graph is ready for the real object. The object swapping service 78 then retrieves the real object and swaps it out with the object reference, which is then discarded. In some situations, the proxy reference cannot perform the functions requested and needs to call the actual object. Again the object swapping service 78 requests the real object and the proxy is responsible for populating the real object with object data.

FIG. 3 also illustrates an example of the system 60 during deserialization of the graph 42 of FIG. 2. Object A includes general markings within the objects that indicate that the object is serialized in accordance with a default rule set. The object type service 72 instantiates an object of type A and object A is deserialized into type A as illustrated in graph 86 and graph 88. Object B implements methods from a rule set that allows a user to define serialization and deserialization of B such that portions of object B will not be serialized. The object type service 72 instantiates an object of type B and B' is deserialized into type B as illustrated in graph 86 and graph 88. Object F is an object reference and the object tracking service 76 holds the object reference until the fixup service 74 is ready to provide fixups. The object swapping service 78 then retrieves the actual object C and inserts it into the graph 88. Object C is an object that is restricted to one instance per process. Object G is a marshal reference. The object swapping service 78 creates a proxy H for communicating with the marshal object D through the marshal reference G (FIG. 2). The object swapping service 78 then assists the proxy H in retrieving the marshal object D and reference object E if necessary as illustrated in graph 88.

Figure 4:
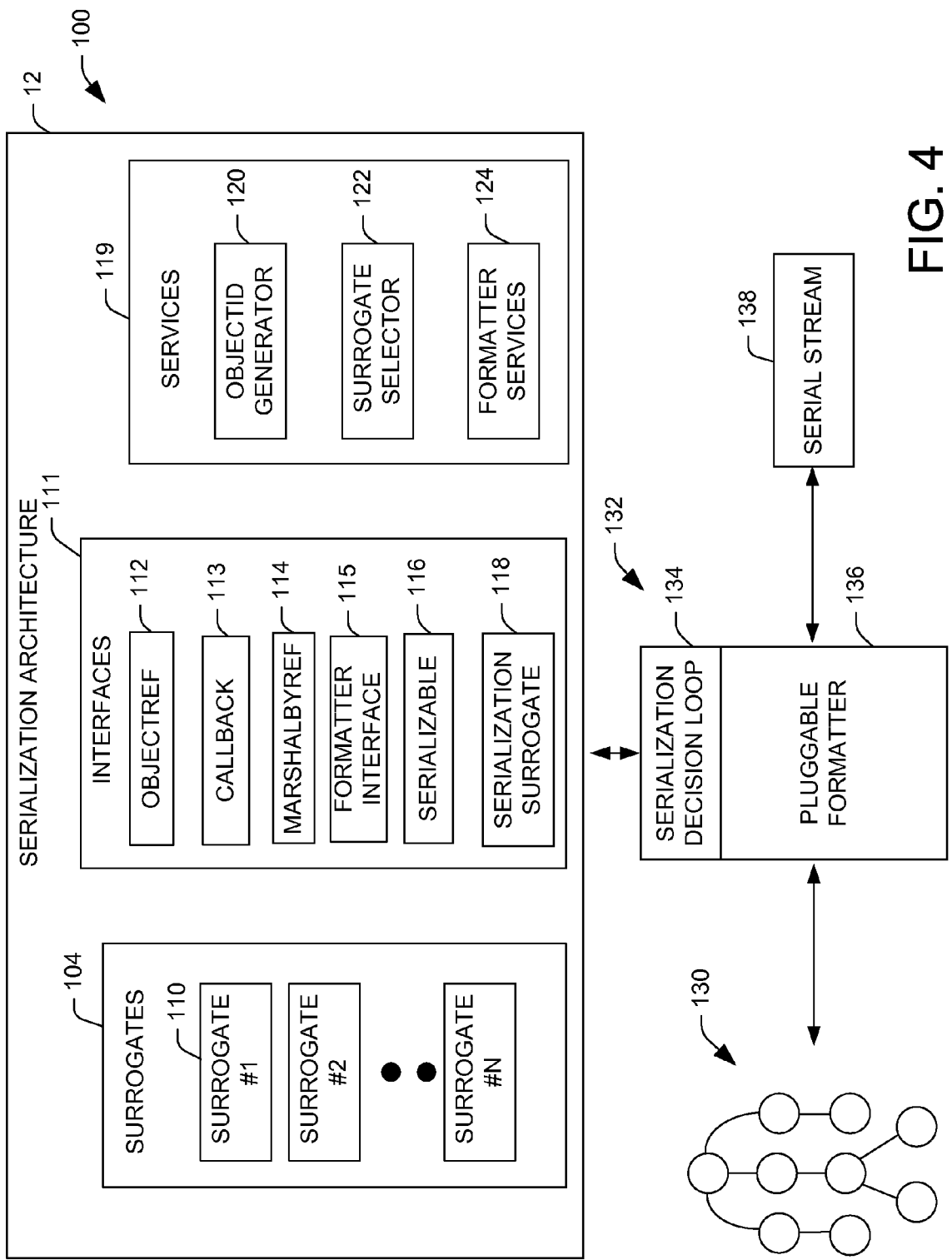
FIG. 4 is a schematic block diagram illustrating a system that facilitates serialization of a graph of objects into a serialization stream employing a serialization architecture with a plurality of components in accordance with another aspect of the present invention.

The services described in FIGS. 2-3 can be provided in a serialization architecture. FIG. 4 illustrates a system 100 employing such a serialization architecture 102 for serializing a graph of objects 130 into a serial stream 138. The serialization architecture 102 is comprised of a plurality of components that could be interfaces, classes, methods, services or functions that are called, inherited or invoked by a formatter 132. It is to be appreciated that one or more of the components can be integrated into a single interface, class, method, service or function and the functionality of one or more components can be implemented into several components as long as the functionality is maintained in accordance with the present invention. In the present example, the serialization architecture 102 includes a plurality of interfaces 111 that can be implemented into classes by class authors to allow the class author to control how an object type is serialized and deserialized. The serialization architecture also includes a plurality of services 119 employed by the formatter 132 in the serialization process. The serialization architecture 102 also includes a plurality of surrogates 104. A surrogate is an external object which specifies what information is serialized for an object of a particular type. A surrogate allows a class author to define serialization rules for object types in a third party object.

A formatter interface component 115 is implemented by any class that wishes to hold itself out as a formatter. The formatter interface component 115 provides base functionality for runtime serialization formatters. The formatter interface component 115 provides the methods to carry out the serialization process. By default, the serialization process records an object's state by gathering the values of all of its fields (e.g., public and private). These fields are saved to the stream along with information (e.g., metadata) about the object for its type.

The serialization architecture 102 allows developers to select how they would like their objects serialized. For example, a surrogate selector component 122 determines if a class author has specified a surrogate for objects of that type. A class author can define a class as a surrogate by implementing a serialization surrogate interface 118 into the class. The surrogate selector component 122 determines which surrogate, if any, to be used for a particular type. The surrogate selector 122 can be set as a property on the formatter. The surrogate selector component 122 controls the selection of the surrogate 110 from a plurality of surrogates 104. Before a given object is serialized, the formatter 132 queries the surrogate selector 122 to see if it wishes to handle objects of that type. If so, the surrogate selector 122 returns an instance of a surrogate 110 that provides serialization information during the serialization or deserialization process. The surrogate selector 122 can be chained. The surrogate 110 defines the serialization information for the object instead of the serialization information being defined in the object itself. A surrogate 110 allows a developer to specify an object that knows how to handle the serialization of a particular object type.

Objects that wish to control their own serialization can do so by implementing a serializable interface 116 in the class. The serialization interface 116 provides methods for allowing a class author to specify how the object is to be serialized within the object. If a class author wants the object to be serializable, the class author can mark that object as being serializable or provide serializable attributes in the object. The class author can also marks portions of the objects with non-serializable attributes so that these portions do not get serialized. The formatter 132 will then call a formatter services component 124, which will employ a default serialization for the object. The serializable interface 116 allows the class author to specify the data transmitted on the stream and control how the object is reinstantiated based on that data. For example, the serializable interface 116 can be an interface that specifies only one method (e.g., GetObjectData) but also implies the existence of a constructor with a certain signature. The method is called by the formatter 132, the formatter services 124 or the formatter interface 115 during serialization.

At that point, the object is responsible for adding the set of information required to specify its state to the serialization information as a set of name-value pairs. The user is also responsible for providing the object type as an additional form of metadata. Serialization information is a set of name-value pairs (e.g., a set of tuples of name, type, value) that contains the information necessary to serialize or deserialize an object. At serialization time, the object is responsible for inserting its values into the information. At deserialization time, it can read out the same name-value pairs. Any objects added to the serialization information are automatically tracked by the formatter 132 for later deserialization. If any object in the graph 130 is not serializable, the formatter interface 124 will fail serialization.

The formatter 132 includes a serialization decision loop 134 and a pluggable formatter portion 136. The serialization decision loop 134 is responsible for retrieving objects within the object graph 130 and pushing those objects to the pluggable formatter portion 136 for serialization and encoding into the serial stream 138 in an externalized format. The serialization decision loop 134 can be implemented into a variety of pluggable formatters with different externalized formats. The serialization decision loop 134 also determines if an object referenced within the object graph 130 was previously retrieved, and assigns objects an object ID via an object ID generator 120 if that object has not been previously retrieved. The serialization decision loop 134 or the object ID generator 120 maintains an object list for tracking previously retrieved objects.

Once it is determined if the object was or was not previously retrieved and the object ID is assigned to that object, the serialization decision loop 134 determines if the object has a surrogate selector 122. Objects do not have to be marked as serializable to have a surrogate. Therefore, serialization information can be defined for classes that already existed prior to the present invention. If there is a surrogate selector 122 for that particular formatter, the serialization decision loop 134 then asks the surrogate selector 122 if it wishes to handle serialization of objects of this type. If so, the surrogate selector 122 provides the selected surrogate 110 for defining what serialization information will be provided to the formatter 132. If there is no surrogate, the serialization decision loop 134 determines if the object is serializable (e.g., marked with serializable attributes). If the object is not serializable, the serialization decision loop 134 returns a failure through the formatter interface component 115. If the object is serializable, the serialization decision loop 134 proceeds. If the object implements the serializable interface 116, a method is employed and serialization information is provided to the formatter 132 defined by the class author within the object. If there is no surrogate 110 and the object does not implement the serializable interface 116, default serialization is provided through the formatter services component 124 which provides the serialization information to the formatter 132.

An object can be changed into a remote object by implementing a marshal by reference (MarshalByRef) interface 114 into the class. In remoting scenarios, a single surrogate dictates the data that is transmitted for every object which extends the MarshalByRef interface 114. An object can also include an object that implements an object reference interface 112, so that serialization information can be provided on the object reference type instead of the object type itself. For example, an object employing the serializable interface 116 can change its type to an object reference type. The object reference type can then reside in another class that provides serialization information for the object reference type. The object reference type then contains information on the object and how to retrieve the actual object when it is safe to do so.

In standard serialization, an empty object is created at deserialization and populated with data from the stream. However, there are some cases when a new instance of the object cannot be instantiated. For example, some types are guaranteed to only have one instance per process. The object reference interface 112 allows the class author to transmit another type containing information about the object to be reinstantiated. Instead of transmitting the information contained in an object type, a different object which implements the object reference interface is transmitted or serialization information about the object reference type is transmitted. After the object reference has been deserialized, the serialization architecture will call to get the real object and add the real object to the graph.

A callback interface 113 is provided to allow class authors to define fixups that can be provided to objects after the graph is complete. This interface is implemented by objects which need to take some action, such as performing additional fixups, that cannot be taken until the entire graph has been deserialized. This is useful for types which wish to run some code which requires access to child objects. An example of this is a hashtable which needs to compute all of the hashcodes on its objects. Since calling GetHashCode on an object can cause that object to execute code which touches one of its children and the nature of serialization is such that the children cannot be guaranteed to be present until the entire graph is deserialized, calling this at runtime could cause the object to throw an exception. The process is saved until the end of serialization when all objects are present and the hashtable is given a chance to go back and fix itself.

Figure 5:
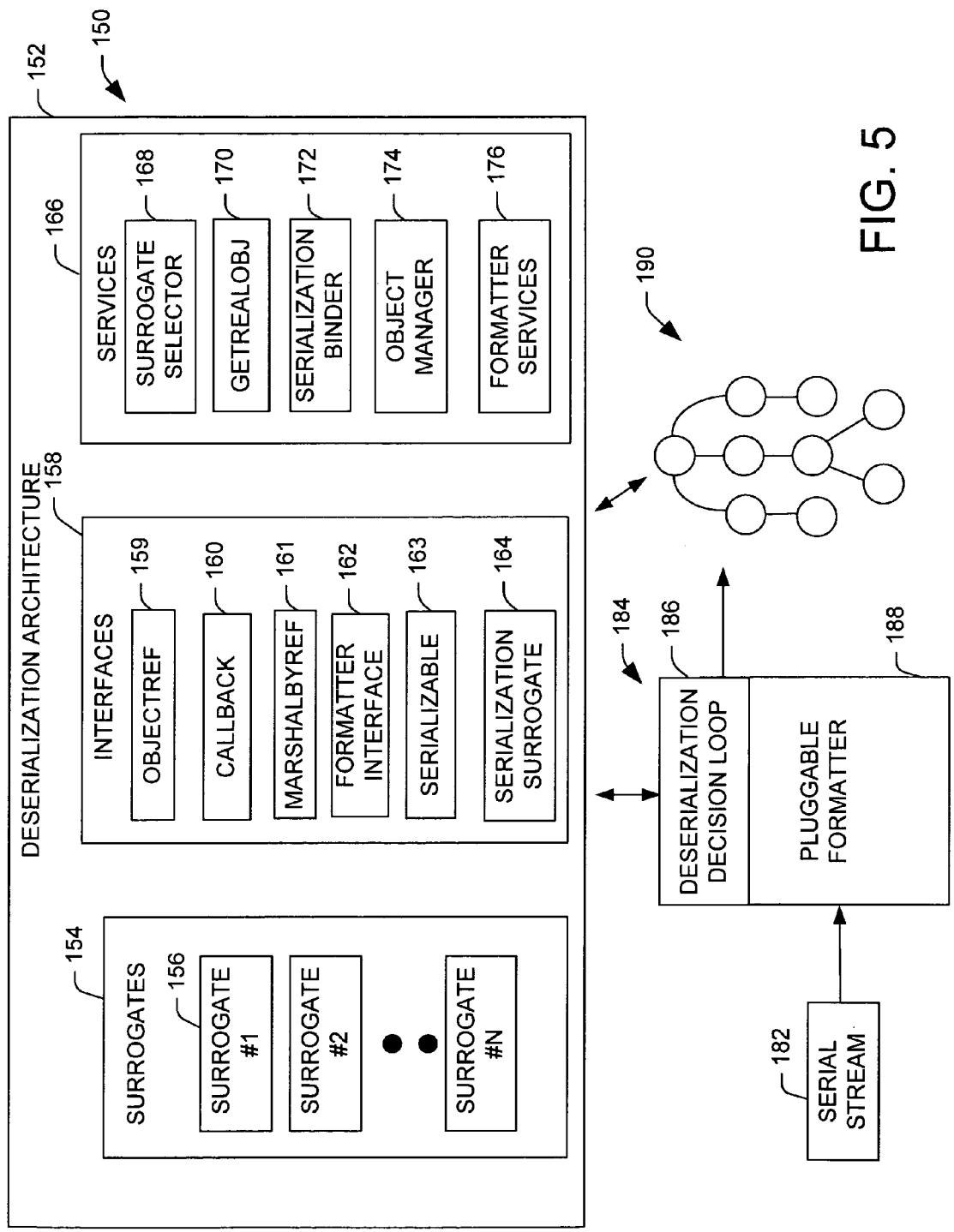
FIG. 5 is a schematic block diagram illustrating a system that facilitates deserialization of a graph of objects from a serialization stream employing a deserialization architecture with a plurality of components in accordance with another aspect of the present invention.

FIG. 5 illustrates a system 150 employing a deserialization architecture 152 for deserializing a serial stream into a graph of objects. The deserialization architecture 152 is comprised of a plurality of components that could be interfaces, classes, methods, services or functions that are called, inherited or invoked by a formatter 184. The deserialization architecture 152 includes a plurality of interfaces 158 that are checked during the deserialization process. The deserialization architecture 152 also includes a plurality of services 166 employed by the formatter 184 in the deserialization process. The deserialization architecture 152 also includes a plurality of surrogates 154 that allow the formatter 184 to know how an object type is serialized so that the object type can be deserialized. The plurality of interfaces 158 include an object reference interface 159, a callback interface 160, a MarshalByRef interface 161, a formatter interface 162, a serializable interface 163 and a serialization surrogate interface 164. The presence of the interfaces is verified during the deserialization process.

The formatter 184 includes a deserialization decision loop 186 and a pluggable formatter portion 188. The pluggable formatter portion 188 receives a serial stream 182 in an encoded/serialized format in which the pluggable formatter portion 188 working in conjunction with the serialization architecture 152 is designed to convert into object form (e.g., decode, deserialize). A formatter services component 176 reads information from the formatter 184 that has received an object of a particular type. The formatter services component 176 can be integrated into the formatter 184 or provided as a service separate from the formatter 184. Given the object type, the formatter services component 176 checks with a serialization binder component 172 as to what is the correct object type to employ in deserialization. The serialization binder component 172 allows a user or developer to override the object type to be loaded for deserialization. When serializing objects, the formatter services component 176 or the formatter 184 is responsible for writing the type information for each object.

In the standard case, the formatter services component 176 will instantiate an object of exactly that type at deserialization and populate that with the data. However, in some cases users want to repopulate an object of a different type. The serialization binder component 172 is responsible for returning a type object to the formatter 184 if the serialization binder component 172 wishes to change the object into which the data is deserialized. If the serialization binder component 172 returns null, the type specified on the stream is instantiated for deserialization.

Once the type is determined, the formatter services component 176 creates an uninitialized instance of that type. No constructor is ever called on this object, except for objects implementing a formatter interface 162. The object is registered with an object manager component 174 along with its object ID. The deserialization decision loop 186 then checks if this type has a surrogate selector 168 to determine if the surrogate selector 168 wishes to control the deserialization of objects of that type. If the surrogate selector 168 does exist and does wish to control deserialization, serialization information of the object is read from the serialization stream 182 and the surrogate 156 is called. The surrogate implements a serialization surrogate interface 164. If the type implements a serializable interface 164, the serialization information of the object is read from the serialization stream 182 and the methods of the formatter interface 162 is called within the object. Otherwise, the serialization information of the object is read from the serialization stream 182 and the default serialization is employed.

The object manager 174 tracks the objects as they are deserialized. The formatter 184 looks at the object and determines if the object has a forward reference to some object later in the stream. The object manager 174 tracks these forward references. The formatter services component 176 or the formatter 184 registers the serialization information, the object and any fixups with the object manager 174. The formatter 184 then populates the uninitialized object with any data that is available. The object manager 174 performs fixups during the deserialization process. The object manager 174 will also handle any remoting procedures (e.g., extracting the real object for any object that transmitted a reference object type, proxies). If the object is a reference object type, the object manager will call a get real object (GetRealObj) component 170 after the object has been deserialized. The real object will be returned and added to the graph. If the object is an object reference to a MarshalByRef object, the formatter services component 176 can provide a proxy reference for communicating to the MarshalByRef object through the marshal reference. The object manager 174 also tracks objects which implement the callback interface 160 and calls them back after deserialization is finished, all available fixups have been performed, and all objects implementing an object reference have been resolved. This allows the object to do some fixups (e.g., hashtables) that are not possible when the graph 190 is only partially deserialized.

In view of the foregoing structural and functional features described above, a methodology in accordance with various aspects of the present invention will be better appreciated with reference to FIGS. 6-9. While, for purposes of simplicity of explanation, the methodology of FIGS. 6-9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. It is further to be appreciated that the following methodology may be implemented as computer-executable instructions, such as software stored in a computer-readable medium. Alternatively, the methodology may be implemented as hardware or a combination of hardware and software.

Figure 6:
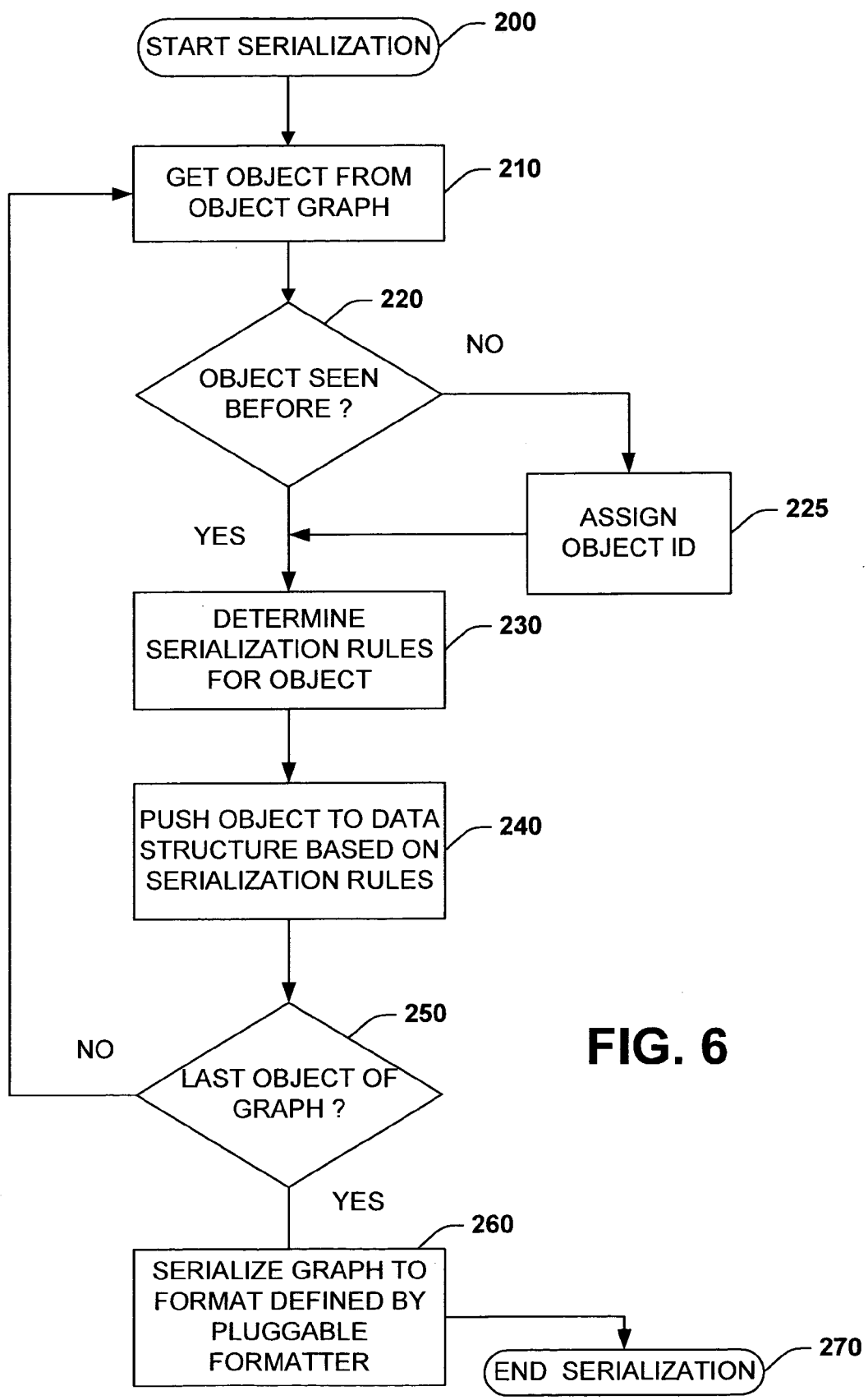
FIG. 6 illustrates a flow diagram of a methodology of serialization of a graph of objects into a serialization stream in accordance with one aspect of the present invention.

FIG. 6 illustrates one particular methodology for serialization of a graph of objects into a serialization stream in accordance with one aspect of the present invention. The methodology begins at 200 where serialization is invoked to serialize a graph of objects. At 210, an object is retrieved from an object graph. At 220, the method determines if the object has been seen before. If the object has been seen before (YES), the method proceeds to 230. If the method has not been seen before (NO), the method advances to 225 where the object is assigned an object ID. At 230, the methodology determines the serialization rules for the object based on the object's type from a plurality of serialization rules. For example, the serialization rules can be defined in the object by implementing a serializable interface and defining the serialization information that will be provided. Alternatively, a surrogate or third party object can be provided that defines the serialization information that will be provided for objects of a given type. Finally, a default serialization may be employed if the object is marked with serializable attributes but does not have a surrogate or implement a serializable interface. The serialization rules may restrict object information from being serialized, specify a different object type to be serialized or specify that the object is a remote object type and provide serialization information accordingly.

At 240, the object is pushed to a data structure based on the defined serialization rules. At 250, the methodology determines if the object is the last object of the graph. If the object is not the last object of the graph (NO), the methodology returns to 210 to get the next object of the graph. If the object is the last object of the graph (YES), the methodology proceeds to step 260. At 260, the graph is serialized to an externalized format defined by the pluggable formatter. The serialization routine then is completed at 270.

Figure 7:
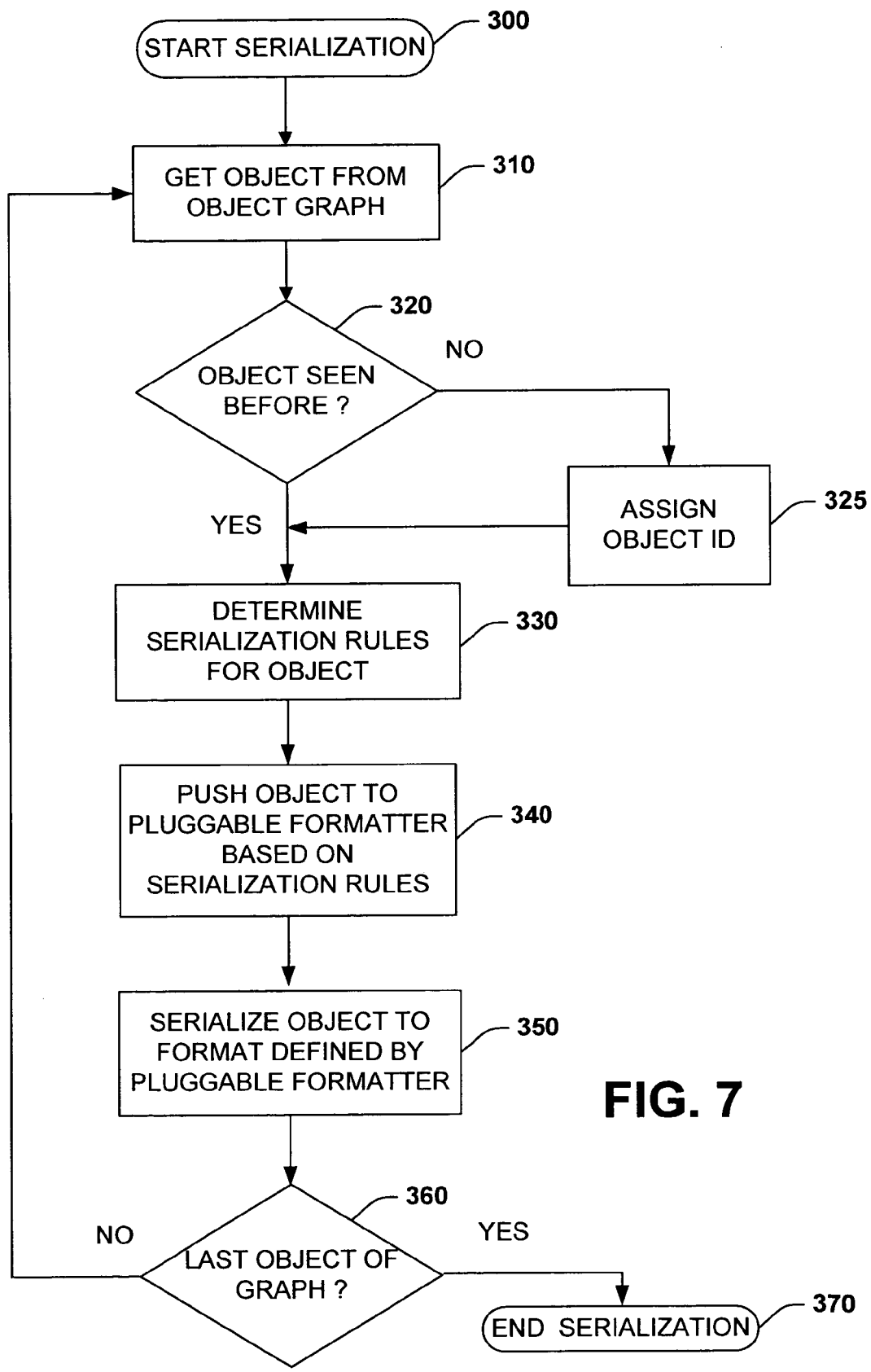
FIG. 7 illustrates a flow diagram of a methodology of serialization of a graph of objects into a serialization stream in accordance with another aspect of the present invention.

FIG. 7 illustrates another particular methodology for serialization of a graph of objects into a serialization stream in accordance with one aspect of the present invention. The methodology begins at 300 where serialization is invoked to serialize a graph of objects. At 310, an object is retrieved from an object graph. At 320, the method determines if the object has been seen before. If the object has been seen before (YES), the method proceeds to 330. If the object has not been seen before (NO), the method advances to 325 where the object is assigned an object ID. At 330, the methodology determines the serialization rules for that object from a plurality of serialization rules. For example, the method can determine if a surrogate selector is available for objects if this type and a surrogate provided that handles the serialization information. Alternatively, the object may implement the serializable interface and define its own serialization rules. Finally, a default serialization may be employed if the object is marked with serializable attributes but does not have a surrogate or implement a serializable interface. Furthermore, the serialization rule may restrict object information from being serialized, specify a different object type to be serialized or specify that the object is a remote object type.

At 340, the object is pushed to a formatter based on the defined serialization rules. At 350, the graph is serialized to an externalized format defined by the formatter. At 360, the methodology determines if the object is the last object of the graph. If the object is not the last object of the graph (NO), the methodology returns to 310 to get the next object of the graph. If the object is the last object of the graph (YES), the methodology proceeds to step 370. The serialization routine then is completed at 370.

Figure 8:
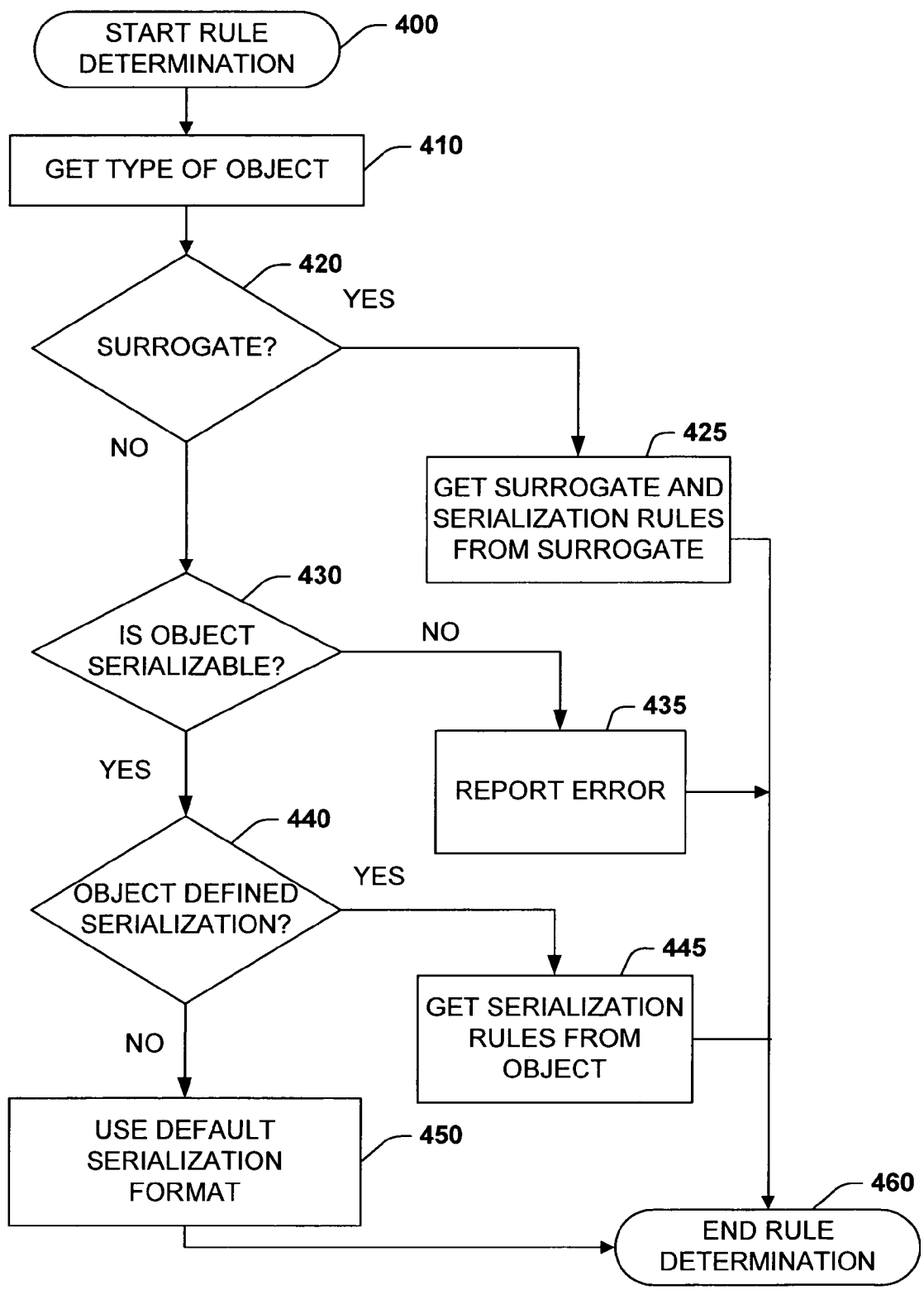
FIG. 8 illustrates a flow diagram of a methodology of determining a serialization rule for an object in accordance with another aspect of the present invention.

FIG. 8 illustrates one particular methodology for determining serialization rules for an object in accordance with one aspect of the present invention. The methodology begins at 400 where rule determination begins. At 410, the type of object is determined. Based on the object type, a determination is made on whether or not the object has a surrogate at 420. If the object has a surrogate (YES), the methodology proceeds to 425. At 425, the surrogate and the serialization rules from the surrogate are retrieved. The rule determination then ends at 460. If an object has a surrogate it does not need to be marked as serializable. If the object does not have a surrogate (NO), the methodology proceeds to 430. At 430, the methodology determines if the object is serializable. If the object is not serializable (NO), the method proceeds to 435 to return an error. The rule determination then ends at 460. If the object is serializable (YES), the methodology advances to 440. At 440, a determination is made of whether serialization rules are defined in the object. If the serialization rules are defined in the object (YES), the method proceeds to 445 to retrieve the serialization rules from the object. If the serialization rules are not defined in the object (NO), the method proceeds to 450 to retrieve the default serialization rules. The rule determination then ends at 460.

Figure 9:
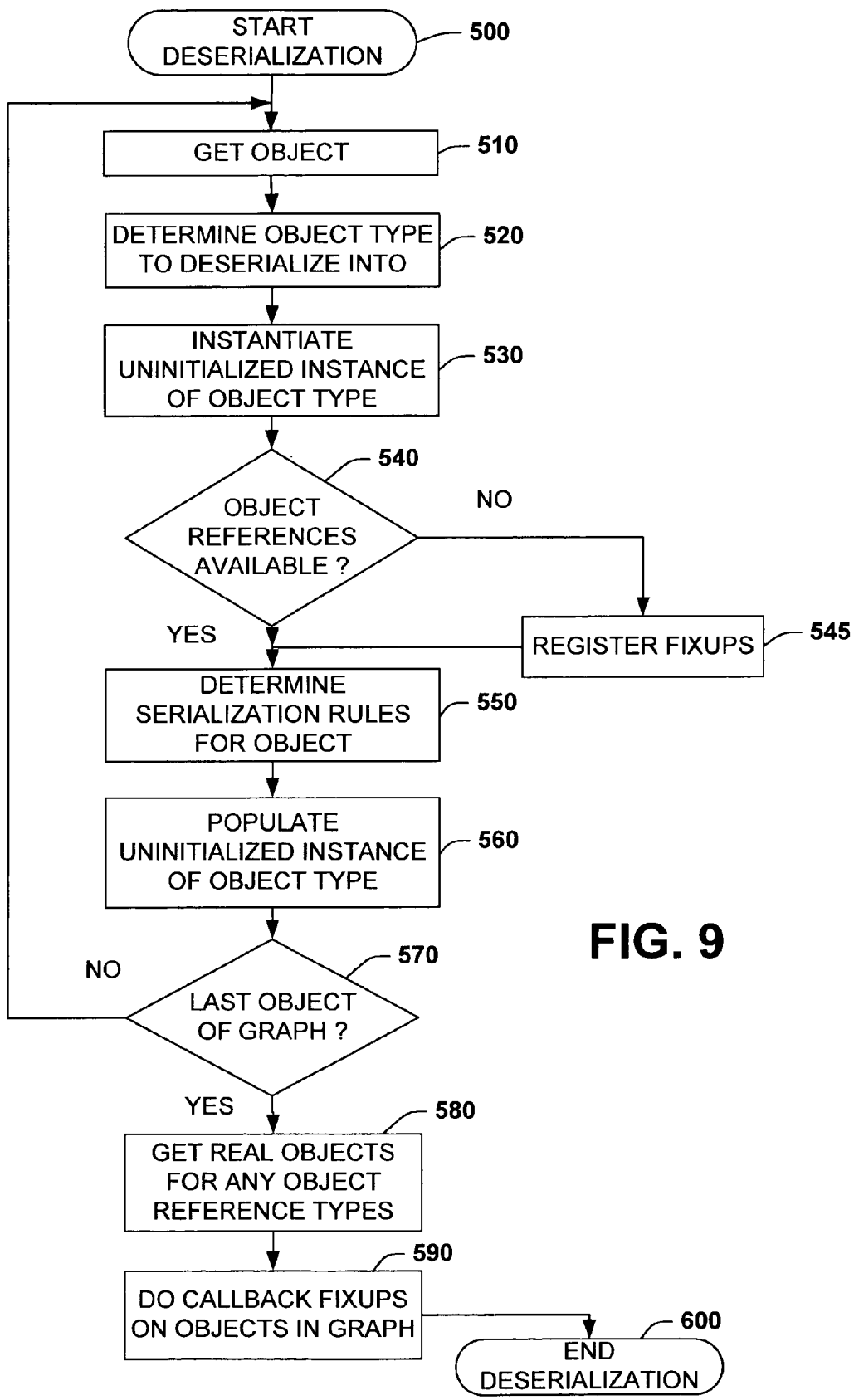
FIG. 9 illustrates a flow diagram of a methodology of deserialization of a serial stream into a graph of objects in accordance with one aspect of the present invention.

FIG. 9 illustrates one particular methodology for deserialization of a serialization stream into a graph of objects in accordance with one aspect of the present invention. The methodology begins at 500 where deserialization is invoked to deserialize a serialization stream into a graph of objects. The serialization stream is a linear collection of objects. At 510, an object is retrieved from a serialization stream and registered with an object manager or the like. At 520, the methodology determines what object type is to be populated with object information. For example, the object type can be the same type as the type off the serialization stream or another type defined by the user, for example, by employing a serialization binder service. At 530, an uninitialized instance of the selected object type is provided for deserialization.

At 540, the methodology determines if the object has any objects it references that have not been seen previously. If the object does not have any objects that it references that have not been seen previously, the method proceeds to 550. If the object does have objects that it references that have not been seen previously, the method advances to 545 where the object registers fixups with the object manager corresponding to any objects it references that are not currently available. The object manager can perform fixups to the object graph in parallel with object being registered once the objects that are referenced become available. However, fixups on object reference types (e.g., object implementing the object reference interface) cannot be performed until the real object is retrieved. The methodology then proceeds to 550. At 550, the methodology determines the serialization rules for that object from a plurality of serialization rules.

For example, a surrogate can be associated with an object type and provided to the formatter via a surrogate selector. The surrogate can include customized rules defined by a user. Alternatively, customized rules can be defined in the object by the user through implementation of a serializable interface. Additionally, a set of default serialization rules can be associated with objects of a given type. At 560, the methodology populates an uninitialized instance of the object type with the object data from the stream. At 570, the methodology determines if the object is the last object of the graph. If the object is not the last object of the graph (NO), the methodology returns to 510 to get the next object of the graph. If the object is the last object of the graph (YES), the methodology proceeds to step 580. At 580, the methodology retrieves all real objects for any objects that have serialized objects of an object reference type (e.g., implementing the object reference interface). At 590, all callback fixups are performed on objects in the graph. The callback fixups referred to fixups that cannot be performed on the objects until the deserialization of the graph is complete (e.g., hashtables). The deserialization routine then is completed at 600.

Figure 10:
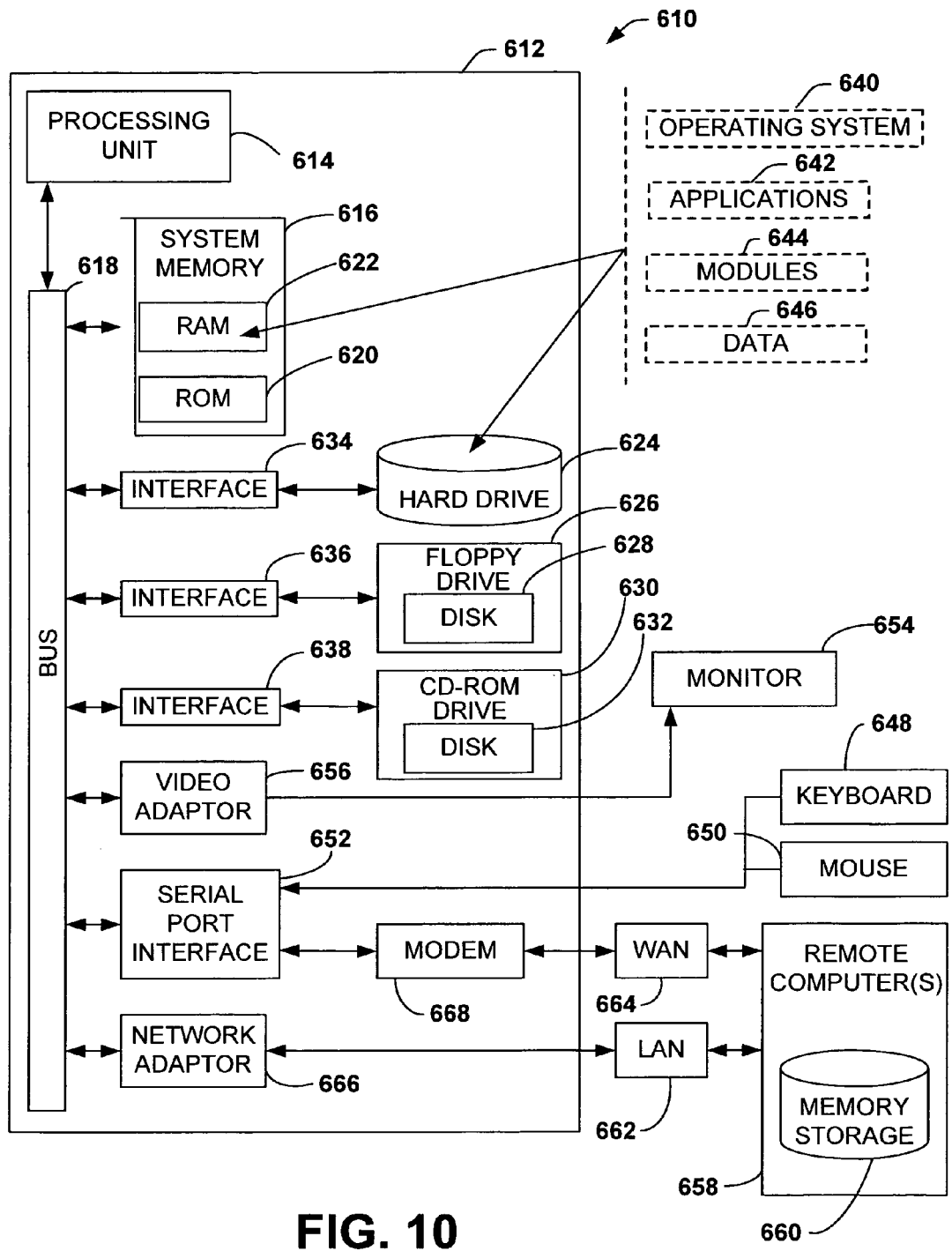
FIG. 10 illustrates a schematic block diagram of an exemplary operating environment for a system configured in accordance with the present invention.

In order to provide additional context for various aspects of the present invention, FIG. 10 and the following discussion are intended to provide a brief, general description of one possible suitable computing environment 610 in which the various aspects of the present invention may be implemented. It is to be appreciated that the computing environment 610 is but one possible computing environment and is not intended to limit the computing environments with which the present invention can be employed. While the invention has been described above in the general context of computer-executable instructions that may run on one or more computers, it is to be recognized that the invention also may be implemented in combination with other program modules and/or as a combination of hardware and software.

Generally, program modules include routines, programs, components, data structures, etc. that perform particular tasks or implement particular abstract data types. Moreover, one will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

FIG. 10 illustrates one possible hardware configuration to support the systems and methods described herein. It is to be appreciated that although a standalone architecture is illustrated, that any suitable computing environment can be employed in accordance with the present invention. For example, computing architectures including, but not limited to, stand alone, multiprocessor, distributed, client/server, minicomputer, mainframe, supercomputer, digital and analog can be employed in accordance with the present invention.

With reference to FIG. 10, the exemplary environment 610 for implementing various aspects of the invention includes a computer 612, including a processing unit 614, a system memory 616, and a system bus 618 that couples various system components including the system memory to the processing unit 614. The processing unit 614 may be any of various commercially available processors. Dual microprocessors and other multi-processor architectures also can be used as the processing unit 614.

The system bus 618 may be any of several types of bus structure including a memory bus or memory controller, a peripheral bus, and a local bus using any of a variety of commercially available bus architectures. The computer memory 616 includes read only memory (ROM) 620 and random access memory (RAM) 622. A basic input/output system (BIOS), containing the basic routines that help to transfer information between elements within the computer 612, such as during start-up, is stored in ROM 620.

The computer 612 may further include a hard disk drive 624, a magnetic disk drive 626, e.g., to read from or write to a removable disk 628, and an optical disk drive 630, e.g., for reading a CD-ROM disk 632 or to read from or write to other optical media. The hard disk drive 624, magnetic disk drive 626, and optical disk drive 630 are connected to the system bus 618 by a hard disk drive interface 634, a magnetic disk drive interface 636, and an optical drive interface 638, respectively. The computer 612 typically includes at least some form of computer readable media. Computer readable media can be any available media that can be accessed by the computer 612. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by the computer 612.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM 622, including an operating system 640, one or more application programs 642, other program modules 644, and program non-interrupt data 646. The operating system 640 in the computer 612 can be any of a number of commercially available operating systems.

A user may enter commands and information into the computer 612 through a keyboard 648 and a pointing device, such as a mouse 650. Other input devices (not shown) may include a microphone, an IR remote control, a joystick, a game pad, a satellite dish, a scanner, or the like. These and other input devices are often connected to the processing unit 614 through a serial port interface 652 that is coupled to the system bus 618, but may be connected by other interfaces, such as a parallel port, a game port, a universal serial bus ("USB"), an IR interface, etc. A monitor 654, or other type of display device, is also connected to the system bus 618 via an interface, such as a video adapter 656. In addition to the monitor, a computer typically includes other peripheral output devices (not shown), such as speakers, printers etc.

The computer 612 may operate in a networked environment using logical and/or physical connections to one or more remote computers, such as a remote computer(s) 658. The remote computer(s) 658 may be a workstation, a server computer, a router, a personal computer, microprocessor based entertainment appliance, a peer device or other common network node, and typically includes many or all of the elements described relative to the computer 612, although, for purposes of brevity, only a memory storage device 660 is illustrated. The logical connections depicted include a local area network (LAN) 662 and a wide area network (WAN) 664. Such networking environments are commonplace in offices, enterprise-wide computer networks, intranets and the Internet.

When used in a LAN networking environment, the computer 612 is connected to the local network 662 through a network interface or adapter 666. When used in a WAN networking environment, the computer 612 typically includes a modem 668, or is connected to a communications server on the LAN, or has other means for establishing communications over the WAN 664, such as the Internet. The modem 668, which may be internal or external, is connected to the system bus 618 via the serial port interface 652. In a networked environment, program modules depicted relative to the computer 612, or portions thereof, may be stored in the remote memory storage device 660. It will be appreciated that the network connections shown are exemplary and other means of establishing a communications link between the computers may be used.

Figure 11:
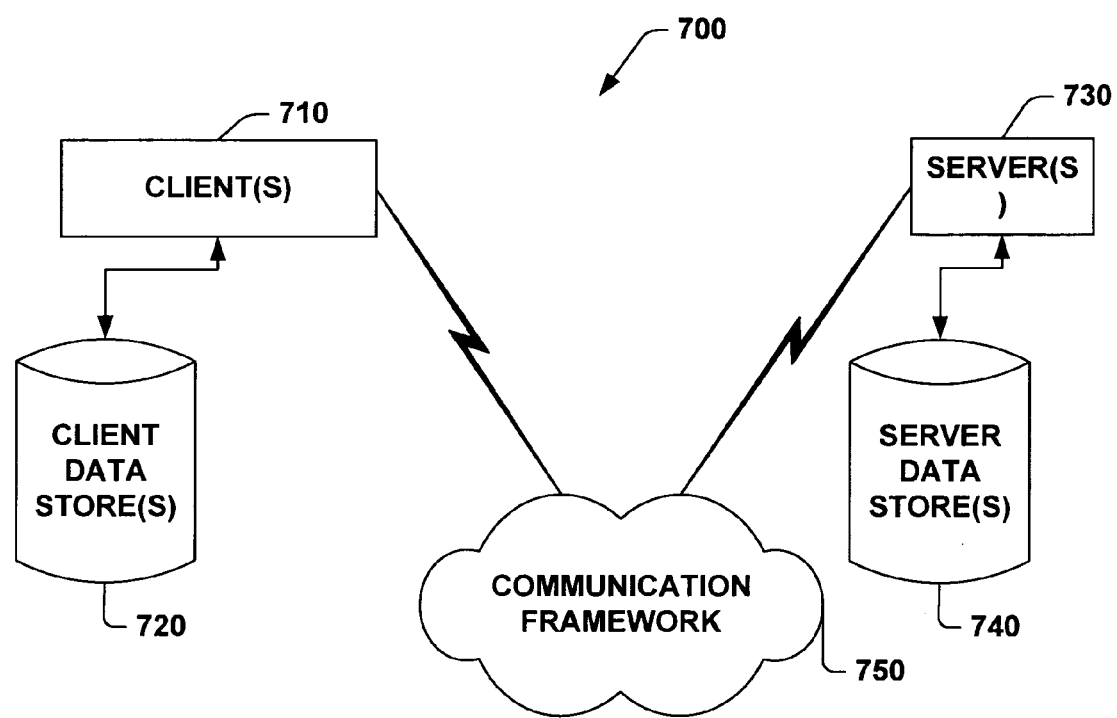
FIG. 11 is a schematic block diagram of an exemplary communication environment configured in accordance with the present invention.

FIG. 11 is a schematic block diagram of a sample computing environment 700 with which the present invention may interact. The system 700 includes one or more clients 710. The clients 710 may be hardware and/or software (e.g., threads, processes, computing devices). The system 700 also includes one or more servers 730. The servers 730 may also be hardware and/or software (e.g., threads, processes, computing devices). The clients 710 may house one or more proxies that can be employed, in a distributed object environment, to image server objects housed on the servers 730.

The system 700 includes a communication framework 750 that can be employed to facilitate communications between the clients 710 and the servers 730. The clients 710 are operably connected to one or more client data stores 715 that can be employed to store information local to the clients 710 (e.g., pluggable formatters, serialization architecture). Similarly, the servers 730 are operably connected to one or more server data stores 740 that can be employed to store information local to the servers 730 (e.g., pluggable formatters, serialization architecture).

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims.

What is claimed is:

1. A computer implemented system comprising:
   a processor that executes the following computer executable components stored on a computer readable medium:
   a serialization component that facilitates serializing at least one object of a graph of objects into a serial stream of data based on a rule set; and
   a formatting component that:
   detects that a user-defined rule set is defined in a different object that is a surrogate for the object, wherein the rule set facilitates defining a reference object to be serialized in place of the object;
   provides a proxy reference for communicating to the object via the reference object; and
   employs the user-defined rule set to serialize and deserialize the object.

2. The system of claim 1, wherein the rule set enables restricting serialization of at least one part of the object.

3. The system of claim 1, wherein the serialization component is enabled to serialize and deserialize the serial stream of data in XML, HTML, and binary formats.

4. The system of claim 1, wherein the rule set defines how an object of a class type is populated to a data structure outside of the object.

5. A computer readable storage medium having stored thereon computer executable components comprising:
    a serializing component that serializes each object of a graph of objects based on a rule set associated with the object;
    a selector component that, for at least one object in the graph of objects:
        determines that an other object is a surrogate for the object to be serialized; and
        informs the serializing component to serialize the object based on a rule set included in the surrogate; and
    a formatter services component that:
        receives a serialized stream of an object;
        instantiates an object type;
        creates a proxy for an object reference derived from a reference object; and
        deserializes the object into the object type by populating the object type with data of the object.

6. The computer readable storage medium of claim 5, further comprising a serialization binder component that determines an object type to instantiate.

7. The computer readable storage medium of claim 6, wherein the object type is similar to a type of the object or a different type defined by a user.

8. The computer readable storage medium of claim 5, wherein the rule set is selected from a plurality of rule sets comprising serializing an object based on XML, HTML, and binary formats.

9. The computer readable storage medium of claim 5, further comprising an object manager that:
    tracks forward references to other objects of the graph of objects; and
    populates an object with data associated with the other object.

10. The computer readable storage medium of claim 9, wherein the object manager retrieves a real object for each serialized object of an object reference type and places the real object in the graph of objects.

11. A computer implemented method for serializing and deserializing a graph of objects, comprising:
    employing a processor to execute computer executable instructions stored on a computer readable medium to perform the following acts:
    retrieving each object from the graph of objects;
    determining that at least one user-defined rule set is included in an object that is a surrogate for the object to be serialized and deserialized;
    selecting a serialization rule set from the at least one user-defined rule set included in the surrogate;
    providing serialization information of an object retrieved from the graph of objects to a formatter, wherein the formatter provides a proxy reference for communicating to the object via a reference object so that the formatter can serialize the retrieved object in an externalized format defined by the selected at least one serialization rule set; and
    during deserialization of the graph of objects:
        determining whether an object includes a forward reference to an other object; and
        populating the object with data associated with the other object.

12. The method of claim 11, wherein the externalized format comprises XML, HTML, and binary formats.

13. The method of claim 11, wherein the serialization information comprises a name value pair representing one or more fields of an object and metadata defining at least one of a type of the object or a type of data associated with the object.

* * * * *